United States Patent [19]

Marvin

[11] 4,259,179

[45] Mar. 31, 1981

[54] METHOD AND APPARATUS FOR SEPARATING SOLIDS

[75] Inventor: John Marvin, Denton, Md.

[73] Assignee: The American Original Corporation, Seaford, Del.

[21] Appl. No.: 15,755

[22] Filed: Feb. 27, 1979

[51] Int. Cl.³ .............................................. B03B 5/62
[52] U.S. Cl. .................................... 209/18; 209/155; 209/173
[58] Field of Search ................. 209/155, 158, 160, 18, 209/173, 12, 162, 423

[56] References Cited

U.S. PATENT DOCUMENTS

| 231,330 | 8/1880 | Kellogg | 209/158 |
|---|---|---|---|
| 1,036,475 | 8/1912 | Evans | 209/160 |
| 1,277,144 | 8/1918 | Sowers | 209/18 |
| 1,459,921 | 6/1923 | Nagel | 209/160 X |
| 1,467,285 | 9/1923 | Harmon | 209/158 |
| 1,477,955 | 12/1923 | Henry | 209/158 X |
| 2,426,839 | 9/1947 | Morris | 209/158 X |
| 2,545,517 | 3/1951 | Harris | 209/173 |
| 3,261,559 | 7/1916 | Yavorsky | 209/158 X |
| 3,478,875 | 11/1969 | Roberts | 209/173 X |

FOREIGN PATENT DOCUMENTS

| 648890 | 9/1962 | Canada | 209/173 |
|---|---|---|---|
| 212436 | 3/1924 | United Kingdom | 209/18 |
| 278651 | 10/1927 | United Kingdom | 209/18 |

Primary Examiner—Robert Halper
Attorney, Agent, or Firm—Schuyler, Banner, Birch, McKie & Beckett

[57] ABSTRACT

A method and apparatus for separating solids of different relative weights by exposing the generally horizontally flowing solids to a fluid separating current flowing in a generally upward direction to buoy up the lighter solids while permitting the heavier solids to sink. The separating current is established by means of a hydrostatic pressure differential between two communicating fluid zones having different fluid levels.

18 Claims, 5 Drawing Figures

METHOD AND APPARATUS FOR SEPARATING SOLIDS

BACKGROUND OF THE INVENTION

1. Field of the Invention

The present invention relates generally to the separation of solids of relatively different weights, and more particularly, to a method and apparatus for separating the lighter meat from the heavier shells of bivalve mollusks.

2. Description of the Prior Art

Brine flotation techniques have long been used to separate the meat from the shells of bivalve mollusks such as clams, oysters and scallops. These techniques take advantage of differences in buoyancy of the meat and shells by collecting floating meat from the surface of a brine bath and heavier shells from the bottom.

While brine flotation works effectively to separate the meat from the shells, the prior art has recognized that the use of brine to achieve the separation can be detrimental to the quality of the meat treated in this manner. Efforts to overcome this problem have involved the use of submerged jets of compressed air in a non-briny bath to buoy the meat upwardly but allow the heavier shells to sink. Rising currents of water which are created by pressurized, submerged water jets have been used to effect separation of other types of solids.

Submerged jets of compressed air may also have a deleterious effect on the bivalve meat in that the meat may be physically damaged by vigorous agitation. Prior art separators which use rising currents of water require expensive and cumbersome high pressure pumps and related equipment to create these currents.

SUMMARY OF THE INVENTION

Accordingly, it is an object of the present invention to obviate the above-noted disadvantages of the prior art by providing a method and apparatus for separating mixtures of solids of different relative weights.

Another object of the invention is to provide a separating method and apparatus which effects separation of solids in a gentle and efficient manner.

A further object of the invention is to provide a separating apparatus which is simple in construction and requires a minimum amount of power to operate.

A further object of the invention is to provide a method for separating the meat from the shells of bivalve mollusks which does not use a damaging brine solution, and which simply and efficiently performs the separation without physically damaging the meat.

These and other objects of the present invention are accomplished by providing a separating apparatus for separating relatively light and heavy solids comprising means defining a first fluid containing zone, means defining a second fluid containing zone, fluid level control means for maintaining the level of fluid in the first zone higher than the level of fluid in the second zone, feeding means for forwarding mixed solids to and generally horizontally through the second zone, and conduit means communicating with the first and second zones for directing fluid from the first zone into the second zone in a generally upwardly directed separating current generally transverse to the current in the second zone, to buoy up the lighter solids so that they continue generally horizontally past the conduit means to remain in the second zone, and permit the heavier solids to sink downwardly through the separating current into the conduit means, thereby being separated from the lighter solids.

The invention further provides a method for separating relatively light and heavy solids comprising the steps of establishing and maintaining a hydrostatic pressure differential between two communicating fluid zones by maintaining the fluid level in the first zone higher than the fluid level in the second zone, forwarding mixed solids to and generally horizontally through the second zone, permitting fluid to flow from the first zone to the second zone in response to the hydrostatic pressure differential as a generally upwardly directed separating current generally transverse to the flow of solids in the second zone to buoy up the lighter solids so that they continue generally horizontally through and remain in the second zone, and permit the heavier solids to sink downwardly through the separating current toward the first zone, thereby being separated from the lighter solids.

BRIEF DESCRIPTION OF THE DRAWINGS

The novel features of the invention are set out with particularity in the appended claims, but the invention will be understood more fully and clearly from the following detailed description of the invention as set forth in the accompanying drawings, in which:

FIG. 4 is a schematic view showing a portion of the fluid circuitry employed.

DESCRIPTION OF THE INVENTION

Figure 1:
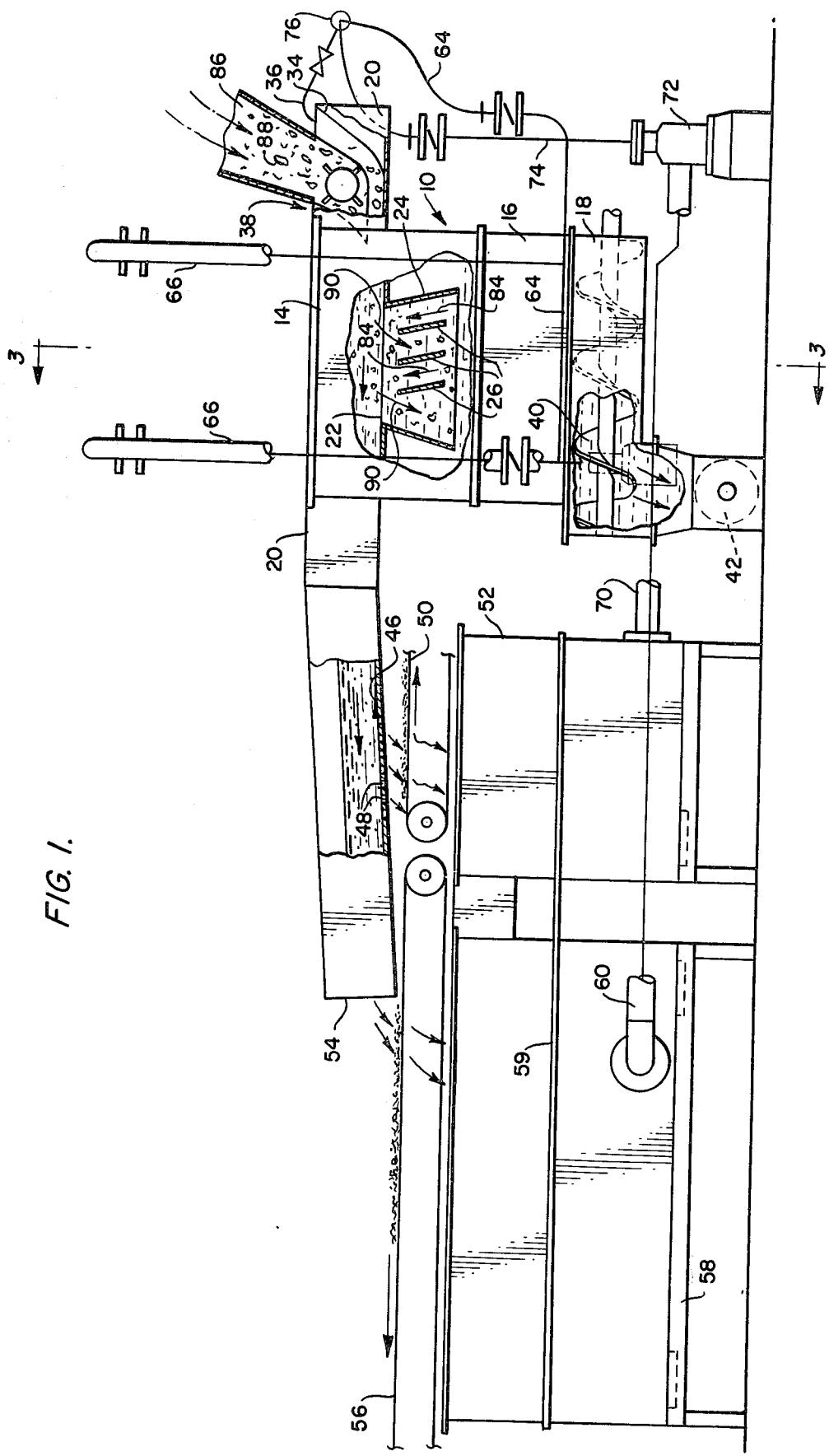
FIG. 1 is a side elevational view, partly in section, of the separating apparatus according to the present invention.
Figure 2:
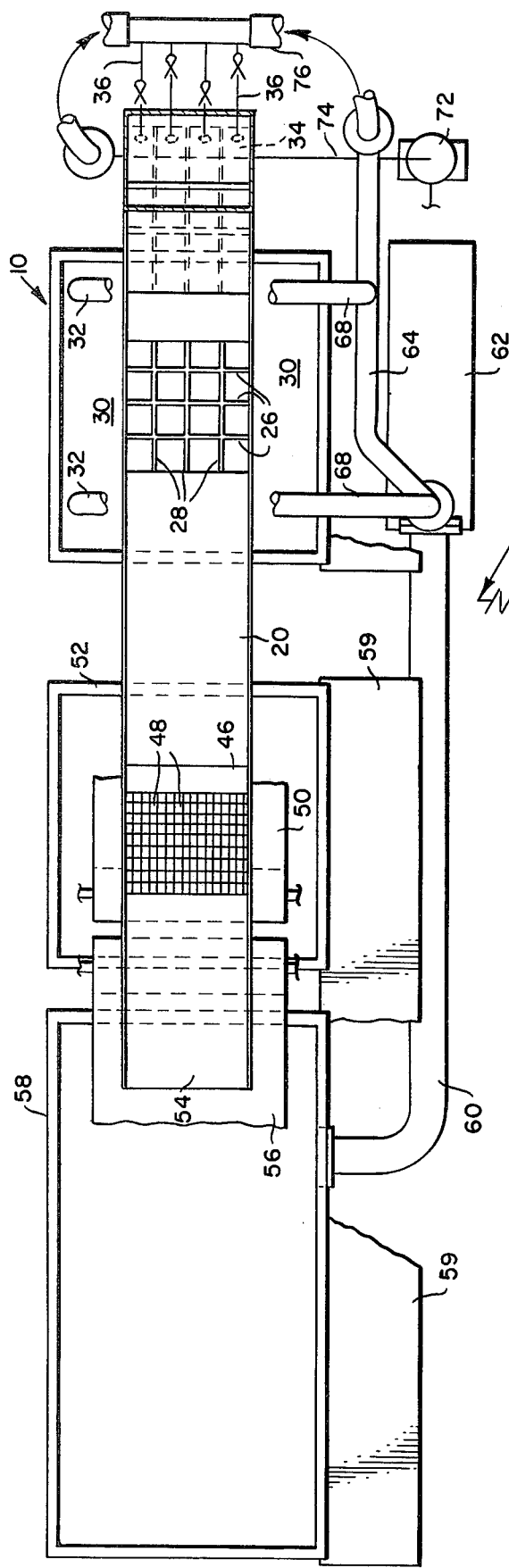
FIG. 2 is a top plan view of the same.
Figure 3:
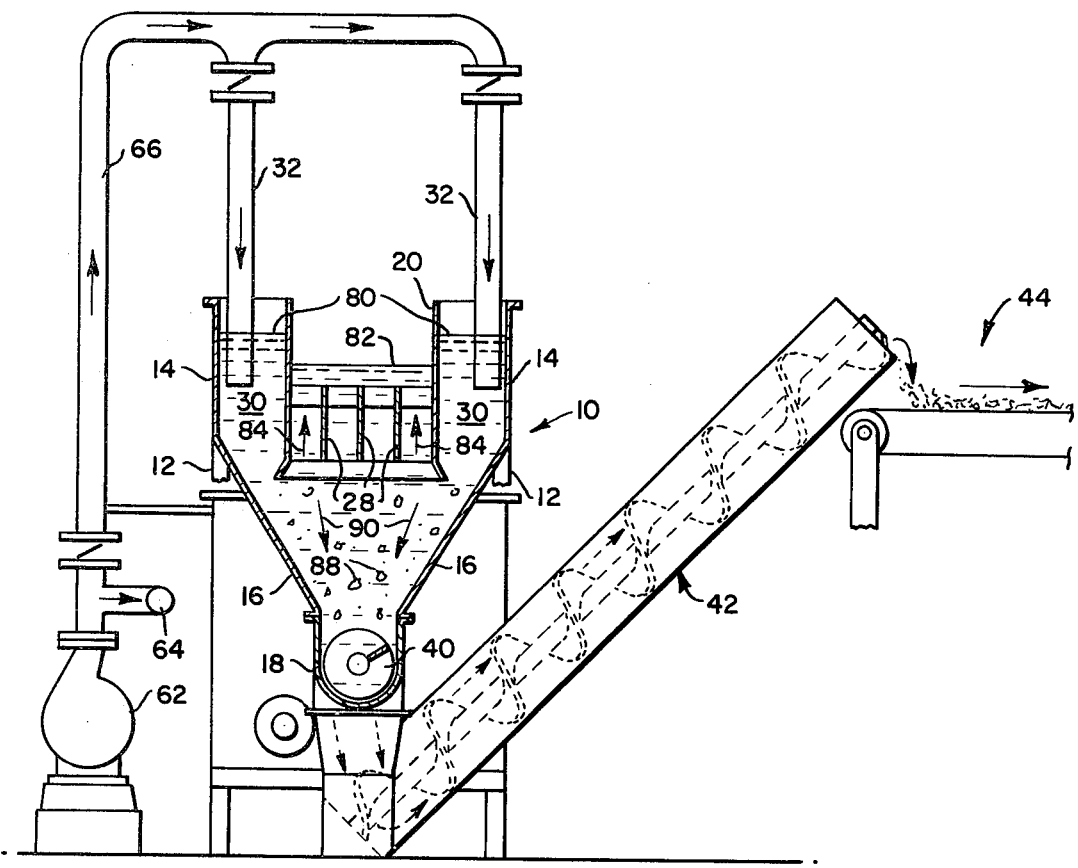
FIG. 3 is a sectional view of the same taken along line 3—3 in FIG. 1.

The separating method and apparatus of the present invention employs a generally upwardly directed separating current to buoy the lighter solids upwardly while permitting the heavier solids to sink. The separating current is established by maintaining a hydrostatic pressure differential between two communicating fluid zones and permitting fluid to flow generally upwardly from one zone into the other. The hydrostatic pressure differential is maintained by maintaining the relative levels of fluid in the two zones at different heights. The separated solids are segregated from the fluid and the fluid may be recycled back into the process.

In the description that follows, the present invention will be described with reference to the separation of clam meat from clam shells. It is to be understood, however, that the invention can be used to effect the separation of any types of solids having different relative weights.

Referring to the preferred embodiment shown in the Figures, the separating apparatus of the present invention comprises a tank 10 supported on frame members 12. The upper portion of the tank has generally vertical side walls 14, while the lower portion of the tank has converging side walls 16 which terminate in U-shaped well 18.

A generally horizontal trough 20 extends across and through the upper portion of the tank 10. The trough has an opening 22 which communicates with the tank 10 below by means of an open-bottom conduit 24. Within conduit 24 are parallel baffle plates 26 which are canted rearwardly at a small angle to the vertical, and transverse guide vanes 28. Baffle plates 26 typically are canted at an angle to the vertical which falls generally within the range of 5 to 25 degrees, 15 degrees being preferred. The width of trough 20 is less than the width of the upper portion of tank 10 so as to provide spaces 30 between trough 20 and side walls 14.

Water is fed to tank 10 by means of pipes 32. Water is fed to trough 20 along channeled incline 34 by means of pipes 36. A mixture of clam meat and shells is fed to trough 20 by means of a motor-driven rotary feeder 38. Clam shells are carried to the end of trough 18 by means of a motor-driven screw conveyor 40. These shells are then removed from trough 18 by means of a motor-driven screw conveyor 42 and a belt conveyor 44. An inclined deflector plate 46 located along the bottom of trough 20 serves to briefly interrupt the flow and project it upwards, whereby residual shell material will cascade downwardly and through openings 48. These shells are carried away by a foraminous conveyor 50 which permits water to drain therethrough into tank 52 below. The remaining meat and water is discharged from the downstream end 54 of trough 20. The meat is carried away by foraminous conveyor 56, and the water drains therethrough into tank 58. A catwalk 59 may be provided for personnel access to the tanks and other components.

The fluid circuitry for supplying water to tank 10 will now be described with reference to FIG. 4. Water is drawn from tank 58 through line 60 by means of pump 62. Pump 62 delivers this water to pipes 32 by means of line 64, risers 66 and overhead manifolds 68. Line 64 is extended to supply water to trough 20, as described below.

Figure 5:
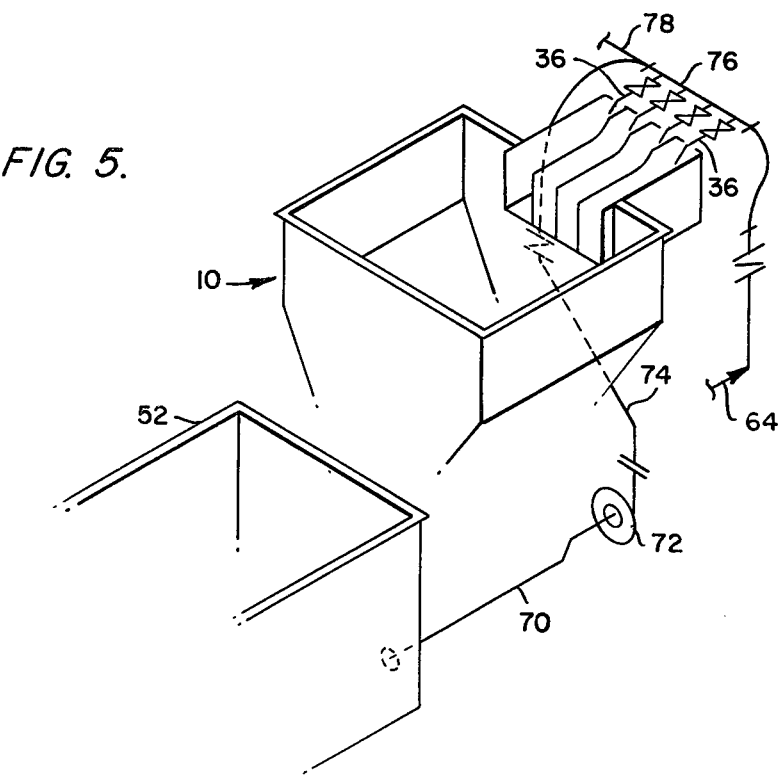
FIG. 5 is a schematic view showing another portion of the fluid circuitry.

The fluid circuitry for supplying water to trough 20 will now be described with reference to FIG. 5. Water is drawn from tank 52 through line 70 by means of pump 72. Pump 72 delivers this water to pipes 36 by means of line 74 and manifold 76. Branch line 78 is provided for the supply of make-up water to the system, when required, to compensate for evaporation and leakage. All lines are suitably valved, as shown, to facilitate proportioning of the water flows for the proper functioning of the apparatus.

In operation, the rates of flow of fluid into the tank and the trough, as well as the rates of discharge of fluid therefrom are controlled by means of selective operation of pumps and valves so as to maintain the level 80 of water within the tank 10 higher than the level 82 of water within the trough 20. For most applications, water is the preferred separating fluid although any other conveniently handled fluid could, of course, be used. The difference in fluid levels creates a hydrostatic pressure differential between tank 10 (a first zone) and trough 20 (a second zone), thus creating a new upflow of water through conduit 24 and into trough 20 as indicated by arrows 84. This net upflow of water constitutes a separating current which, because of the presence of baffle plates 26, has a horizontal component in the direction of water flowing through the trough. In general clam shells drop through water at a rate of about 7 to 10 inches/second while clam meat drops at about 3 to 5 inches/second. Thus for most applications an upflow current having a vertical velocity component of from about 5 to 7 inches/second is suitable to effect the separation of the present invention. A velocity of about 5 inches/second is preferred.

The mixture of clam meat 86 and shells 88 which is added to the trough 20 at its upstream end proceeds in a generally horizontal direction toward the outlet end 54 of the trough. Upon encountering the separating current 84, the meat 86 is buoyed upwardly and is carried across the opening 22 toward the outlet end 40 of the trough. The horizontal component of the separating current assists in propelling the buoyed meat past opening 22. Guide vanes 28 help to stabilize the separating current by eliminating lateral currents within conduit 24. The heavier shells 88 overcome the buoyant effect by virtue of their greater weight and sink through the separating current and the conduit 24 to the bottom of tank 10, as indicated by arrows 90. As previously described, water extracted from the separated meat and shells is recycled back into the process. If desired, the water may be chilled prior to being recycled.

The incoming meat 86 and shells 88 may be conveyed through the trough 20 by any suitable means. In the illustrated embodiment, pressurized fluid from pipes 36 will propel the mixture along the trough 20. Alternatively, the entire trough could be slightly inclined to the horizontal with outlet end 40 disposed lower than the upstream end. In this case, the force of gravity will assist in propelling the meat and shells along the trough. As a further alternative, a mechanically driven conveyor, such as a drag chain, could be positioned in the trough to convey the meat and shells therealong.

While the trough 20 has been illustrated as being disposed inside of tank 10, it is obvious that this need not be the case. Alternatively, the trough could be located outside of and closely adjacent to tank 10, conduit 24 being an external conduit which would connect the bottom of the external trough at a slight angle to the vertical to tank 10.

It will be obvious to one of ordinary skill in the art that numerous modifications may be made without departing from the true spirit and scope of the invention which is to be limited only by the appended claims.

I claim:

1. A separating apparatus for separating relatively light and heavy solids comprising:
    (a) means defining a first fluid containing zone;
    (b) means defining a second fluid containing zone;
    (c) fluid level control means for maintaining the level of fluid in said first zone higher than the level of fluid in said second zone;
    (d) solids feeding means for delivering mixed solids to an upstream end of said second zone;
    (e) fluid feeding means for delivering pressurized fluid horizontally to the upstream end of said second zone to entrain substantially all of said mixed solids and forcefully move them generally horizontally through said second zone, and
    (f) conduit means communicating with said first and second zones for directing fluid from said first zone into said second zone in a generally upwardly directed separating current generally transverse to and with a small flow component in the direction of the generally horizontal flow through said second zone, said separating current being of substantial width in the direction of the generally horizontal flow through said second zone, to buoy up the lighter solids so that they continue generally horizontally past said conduit means to remain in said second zone, and permit the heavier solids to sink downwardly through said separating current into said conduit means, thereby being separated from said lighter solids.

2. A separating apparatus according to claim 1 wherein said second zone is disposed at least partly within said first zone, and the heavier solids sink downwardly through said conduit means and into said first zone.

3. A separating apparatus according to claim 1 wherein said fluid level control means comprises means for supplying fluid to said first zone, first discharge means for removing fluid and heavier solids from said first zone and second discharge means for removing fluid and lighter solids from said second zone.

4. A separating apparatus according to claim 3 further comprising segregating and recycling means for segregating the solids from the fluid and recycling the fluid back into the apparatus.

5. A separating apparatus according to claim 3 wherein said first discharge means comprises at least one screw conveyor for removing fluid and heavier solids from said first zone.

6. A separating apparatus according to claim 3 wherein said fluid level control means further comprises means for adjusting the rates of flow of fluid into and out of the apparatus.

7. A separating apparatus according to claim 1 wherein said means defining a first fluid containing zone comprises a tank, said means defining a second fluid containing zone comprising a generally horizontal trough extending through and across but not completely filling the upper portion of said tank, and having an opening in its bottom communicating with said tank, and said conduit means comprises a conduit connected with said opening and extending generally downwardly therefrom into said tank.

8. A separating apparatus according to claim 7 further comprising a plurality of spaced baffle plates disposed within and generally longitudinally of said conduit, each of said baffle plates extending generally transversely of said trough and canted with its lower edge upstream in relation to the generally horizontal flow through said trough to impart to said separating current a small flow component in the direction of the flow through said trough.

9. A separating apparatus according to claim 8 further comprising a plurality of spaced guide vanes disposed within said conduit transverse to said baffle plates to stabilize said separating current.

10. A method of separating the meat of bivalve mollusks from the heavier shells thereof comprising the steps of:
   (a) establishing and maintaining a hydrostatic pressure differential between two communicating fluid zones by maintaining the fluid level in the first of said zones higher than the fluid level in the second of said zones;
   (b) delivering mixed pieces of meat and shells to an upstream end of said second zone;
   (c) delivering pressurized fluid generally horizontally to the upstream end of said second zone to entrain substantially all of said mixed meat and shell pieces and forcefully move them generally horizontally through said second zone; and
   (d) permitting fluid to flow from said first zone to said second zone in response to said hydrostatic pressure differential as a generally upwardly directed separating current of substantial width in the direction of flow of the horizontal current in said second zone and generally transverse to the flow of meat and shells in said second zone, to buoy up the lighter meat pieces so that they continue generally horizontally through and remain in said second zone, and permit the heavier shells to sink downwardly through said separating current toward said first zone, thereby being separated from said lighter meat.

11. A separating method according to claim 10 further comprising the steps of removing fluid and heavier shells from said first zone and removing fluid and lighter meat from said second zone.

12. A separating method according to claim 11 further comprising the steps of segregating said separated meat and shells from said fluid and recycling the segregated fluid back into the process.

13. A separating method according to claim 11 wherein the step of maintaining said hydrostatic pressure differential comprises adjusting the rates of flow of fluid into and out of said zones to maintain the fluid level in said first zone higher than the fluid level in said second zone.

14. A separating method according to claim 10, 11, 12 or 13 wherein said fluid is water.

15. A separating method according to claim 14 wherein said water is non-briny.

16. A separating apparatus for separating relatively light and heavy solids comprising:
   (a) means defining a first fluid containing zone;
   (b) means defining a second fluid containing zone;
   (c) fluid level control means for maintaining the level of fluid in said first zone higher than the level of fluid in said second zone;
   (d) solids feeding means for delivering mixed solids to an upstream end of said second zone;
   (e) fluid feeding means for delivering pressurized fluid generally horizontally to the upstream end of said second zone to entrain substantially all of said mixed solids and forcefully move them generally horizontally through said second zone, said fluid feeding means comprising a plurality of downwardly inclined fluid supply pipes which discharge fluid into said second zone, and an inclined deflector for diverting fluid discharged from said pipes generally horizontally through said second zone; and
   (f) conduit means communicating with said first and second zones for directing fluid from said first zone into said second zone in a generally upwardly directed separating current generally transverse to and of substantial width in the direction of the generally horizontal flow in said second zone, to buoy up the lighter solids so that they continue generally horizontally past said conduit means to remain in said second zone, and permit the heavier solids to sink downwardly through said separating current into said conduit means, thereby being separated from said lighter solids.

17. A separating apparatus for separating relatively light and heavy solids comprising:
   (a) means defining a first fluid containing zone;
   (b) means defining a second fluid containing zone;
   (c) fluid level control means for maintaining the level of fluid in said first zone higher than the level of fluid in said second zone;
   (d) solids feeding means for delivering mixed solids to an upstream end of said second zone;

(e) fluid feeding means for delivering pressurized fluid generally horizontally to the upstream end of said second zone to entrain substantially all of said mixed solids and forcefully move them generally horizontally through said second zone; and (f) conduit means communicating with said first and second zones for directing fluid from said first zone into said second zone in a generally upwardly directed separating current generally transverse to and of substantial width in the direction of the generally horizontal flow in said second zone, to buoy up the lighter solids so that they continue generally horizontally past said conduit means to remain in said second zone, and permit the heavier solids to sink downwardly through said separating current into said conduit means, thereby being separated from said lighter solids, said conduit means comprising a plurality of spaced baffle plates extending generally parallel to said separating current, generally transversely of the generally horizontal flow through said second zone, and canted with their lower edges upstream in relation to the generally horizontal flow through said second zone to impart to said separating current a small flow component in the direction of the flow through said second zone.

18. A separating apparatus according to claim 17 wherein said conduit means further comprises a plurality of spaced guide vanes disposed transverse to said baffle plates to stabilize said separating current.

* * * * *